Dec. 15, 1959     M. H. PANNING ET AL     2,917,342
PNEUMATIC HOPPER
Filed Nov. 29, 1957     2 Sheets-Sheet 1
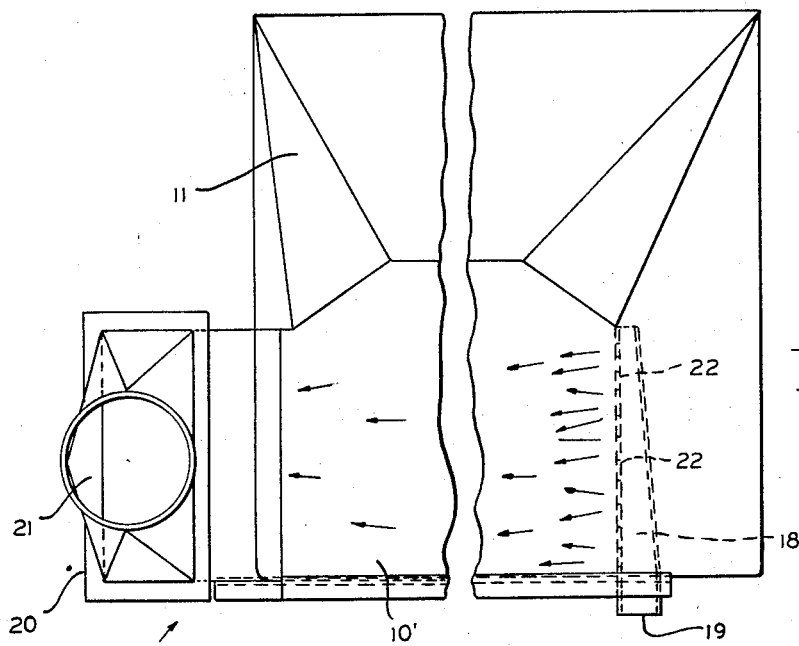
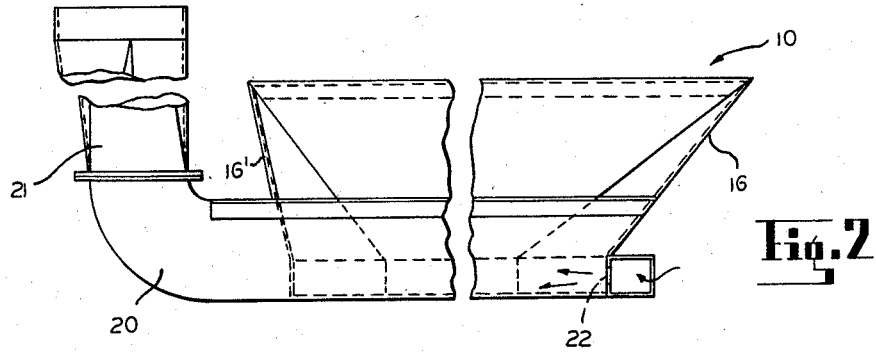
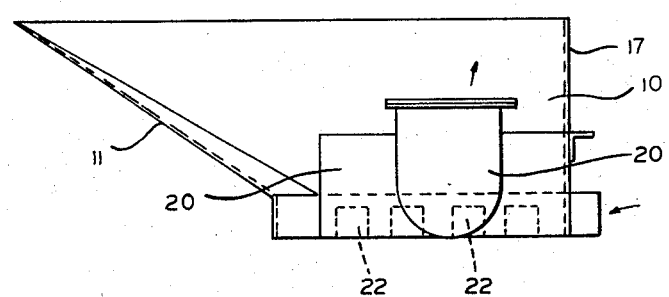
INVENTORS
MARTIN H. PANNING
BRUCE R. CURRY
BY
PARKER & CARTER
ATTORNEYS

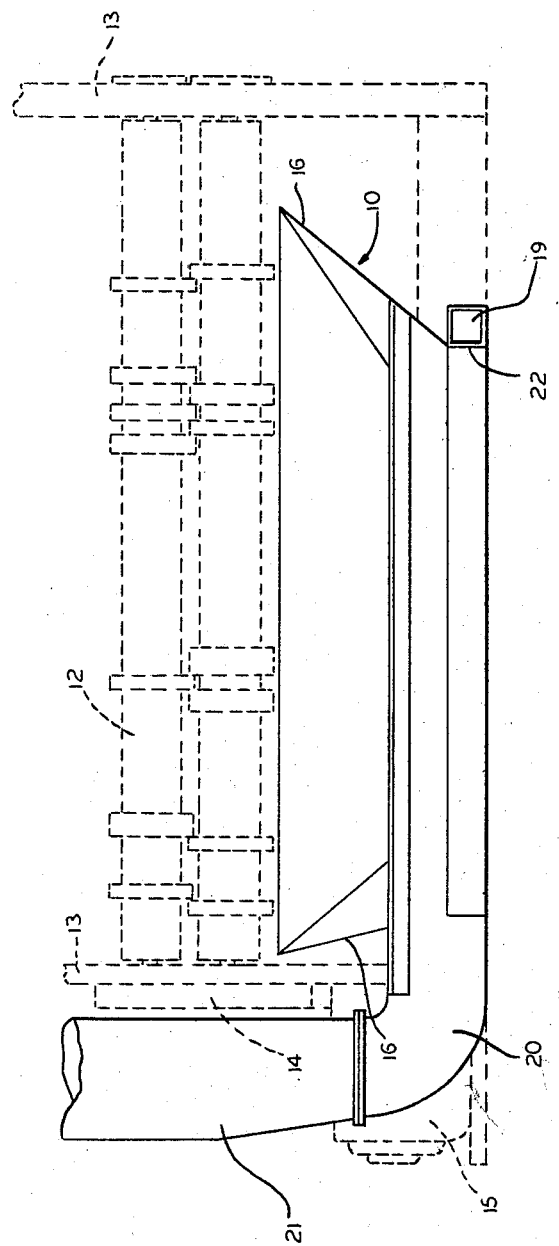

2,917,342

PNEUMATIC HOPPER

Martin H. Panning and Bruce R. Curry, Milwaukee, Wis., assignors to Blower Application Company, Milwaukee, Wis., a corporation of Wisconsin Application November 29, 1957, Serial No. 699,705

2 Claims. (Cl. 302—36)

This invention relates to improvements in waste disposing hoppers of the air-actuated type, especially adapted for collecting scrap or waste from slotting and trimming machines.

To anyone familiar with the operation of a scoring, slotting, or trimming machine when manufacturing cardboard boxes or the like, it is manifest that the cutting and trimming rollers are rotatably mounted one above the other, and that the material being processed passes between the cutting rollers, and is discharged on a conveyor of any conventional design, but the portions of the material that is commonly referred to as waste or scrap material, cut and trimmed from the finished product, is usually permitted to drop onto the floor immediately adjacent the front of the rollers, from which it must be removed, either manually, which is costly, or mechanically, which have proved inadequate and cumbersome.

An object of the invention is to provide a hopper of the air-actuated type which may be placed at the waste discharge end of a trimming and slotting machine, without in any manner affecting the operation of the machine, or interfering with its function.

Another object is to provide a device of the character described which is equipped with a blowing means at one end, for conveying the waste material to the discharge or suction end of the hopper, which is oppositely disposed from the blowing means.

A further object of our invention is to provide a hopper of the character above-mentioned, which is simple in construction, inexpensive to manufacture, yet highly efficient for the purpose for which it is intended.

The device described, illustrated, and claimed herein eliminates all manual labor in removing the waste or scrap, and provides a highly efficient means of disposing of any and all waste material.

Other and further objects of the invention will become more apparent when taken in conjunction with the drawings, in which—

Figure 1 is a plan view of a device constructed in accordance with the invention, with intermediate portions of the hopper broken away, and illustrating the travel of the air from the blower end at the right, to the exhaust end at the left of the hopper, as seen in this Figure;

Figure 2 is a front view showing the end portion of the hopper of Figure 1;

Figure 3 is an end view of the suction end of the hopper; and

Figure 4 is a front view of the hopper as applied to a conventional slotting and trimming machine, of which the adjacent cutting rollers and machine frame are shown in phantom.

Similar characters of reference indicate corresponding parts throughout the several views, and referring now to the same, the hopper is generally indicated by the character 10, which is of such size and shape as to be placed below the cutting rollers of a slotting and trimming machine. The cutting rollers of the machine are shown in phantom at 12 in Figure 4, and the side plates 13 act as bearings for the rollers 12. A gear train 14, and a motor 15 is also shown in phantom, disposed to the one side of the machine in any conventional manner.

The hopper 10 includes a bottom plate 10', the extension plate 11, angularly extending end plates 16, 16' and a vertical front plate 17. A tapered tubular member 18 is disposed along the lower edge of one of the end plates, as for example, the end plate 16. This tubular member is tapered inwardly from an air inlet 19, and has a plurality of inwardly opening discharge ports 22 therealong. The inlet 19 is connected to a conventional blower (not shown).

The opposite end plate 16' has a suction boot 20 connected along its bottom, which boot is connected through a suction duct 21, to a conventional suction fan and collector (not shown).

When the blower is operated, air is discharged through ports 22 along the bottom plate 10' of the hopper toward the exhaust or suction boot 20 in the direction shown by the arrows in Figures 1 and 2, from which the air is carried by suction through the ducts 21 to the collector. The tapered tubular member 18 insures a substantially uniform air discharge from the several openings 22. Thus, the scrap or waste material deposited in the hopper will be continuously removed therefrom by the current of air moved by push-pull action along the bottom plate 10' of said hopper.

From the above description it will become manifest that the invention contemplates a simple arrangement of a hopper of sufficient size to receive the scrap or waste material deposited therein, directly from the cutting and trimming rolls. The blower means forces the air across the bottom of the hopper to the exhaust boot, so as to dispose of the waste material deposited in the hopper, without in any manner affecting the operation of the machine to which the hopper is applied as an accessory.

Although we have shown and described a certain embodiment of our invention, it will be understood that various changes and modifications may be made without departing from the spirit and scope of the invention as defined by the appended claims.

We claim:

1. In a waste disposal hopper adapted for trimming machines or the like, said hopper having bottom, side and end walls, said bottom, side and end walls being joined together so as to define a hopper space therebetween, said end walls being joined at their lower end portions to the bottom wall, an air inlet duct and a separate exhaust boot spaced from one another adjacent said bottom wall so as to leave a substantial portion of the bottom wall of the hopper exposed between said duct and said exhaust boot for the reception of material between said duct and boot, said air inlet duct being disposed along the bottom of one of said end walls, said air inlet duct being connected to a source of air pressure and having discharge opening means directed inwardly from said one end wall and along said bottom wall, said exhaust boot being connected to a source of suction separate from said air pressure source, said exhaust boot having a receiving opening facing said discharge opening means and disposed to receive material directed along said bottom wall by said air inlet duct, whereby material deposited in the hopper is continuously removed therefrom by a push-pull action of air along the bottom wall of said hopper.

2. The structure defined in claim 1 wherein the duct is tapered from its connection with the source of air pressure and provided with a plurality of discharge opening means which are spaced along the lower end portion of said one end wall, thereby providing a substantially uniform air discharge from the discharge openings along said bottom wall.

References Cited in the file of this patent

UNITED STATES PATENTS

| | | |
|---|---|---|
| 310,905 | Milbank | Jan. 20, 1885 |
| 1,843,460 | Rosenberger | Feb. 2, 1932 |
| 2,234,788 | Williams | Mar. 11, 1941 |